(12) United States Patent
Wellwood et al.

(10) Patent No.: US 10,008,299 B2
(45) Date of Patent: Jun. 26, 2018

(54) NUCLEAR FUEL DEBRIS CONTAINER

(71) Applicant: NAC INTERNATIONAL INC., Norcross, GA (US)

(72) Inventors: Jay G. Wellwood, Berkeley lake, GA (US); George C. Carver, Norcross, GA (US); Vadim Z. Shtylman, Alpharetta, GA (US)

(73) Assignee: NAC INTERNATIONAL INC., Norcross, GA (US)

( * ) Notice: Subject to any disclaimer, the term of this patent is extended or adjusted under 35 U.S.C. 154(b) by 286 days.

(21) Appl. No.: 15/447,687

(22) Filed: Mar. 2, 2017

(65) Prior Publication Data

US 2017/0301425 A1    Oct. 19, 2017

Related U.S. Application Data

(60) Provisional application No. 62/302,363, filed on Mar. 2, 2016.

(51) Int. Cl.
| | |
|---|---|
| *G21F 5/00* | (2006.01) |
| *G21F 5/005* | (2006.01) |
| *G21F 5/008* | (2006.01) |
| *G21F 5/14* | (2006.01) |

(52) U.S. Cl.
CPC .............. *G21F 5/005* (2013.01); *G21F 5/14* (2013.01); *G21Y 2002/60* (2013.01)

(58) Field of Classification Search
USPC ........ 250/505.1, 506.1, 507.1, 526; 376/161, 376/170, 180, 272, 309, 435, 463
See application file for complete search history.

(56) References Cited

U.S. PATENT DOCUMENTS

| | | | |
|---|---|---|---|
| 4,666,659 | A | 5/1987 | Lusk et al. |
| 5,550,882 | A | 8/1996 | Lehnert et al. |
| 5,651,038 | A | 7/1997 | Chechelnitsky et al. |
| 5,646,971 | A | 8/1997 | Howe |

(Continued)

FOREIGN PATENT DOCUMENTS

| | | |
|---|---|---|
| DE | 3933530 A1 | 4/1991 |
| DE | 3938519 C2 | 1/2000 |

OTHER PUBLICATIONS

PCT International Search Report and Written Opinion dated Oct. 5, 2017 in co-pending, related application No. PCT/US2017/020383.

*Primary Examiner* — Bernard Souw
(74) *Attorney, Agent, or Firm* — Thomas | Horstemeyer, LLP

(57) ABSTRACT

A container is designed to safely store radioactive debris from, for example, a nuclear reactor meltdown, in water or air. The container, with preferably although not necessarily all metal parts, has an overpack having an elongated cylindrical body extending between a top end and a bottom end, a planar bottom part at the bottom end, an open top at the top end, and a circular planar lid mounted over the open top. A basket is situated inside of the overpack. The basket has a plurality of elongated cylindrical canisters that are in parallel along their lengths. Each of the canisters has an elongated cylindrical body extending between a top end and a bottom end, a planar bottom part at the bottom end, an open top at the top end, and a circular planar lid mounted over the open top.

20 Claims, 14 Drawing Sheets

(56) References Cited

U.S. PATENT DOCUMENTS

| | | | |
|---|---|---|---|
| 5,832,392 A * | 11/1998 | Forsberg | G21F 1/085 |
| | | | 588/16 |
| 5,898,747 A | 4/1999 | Singh | |
| 7,812,331 B2 * | 10/2010 | Wickland | G21F 5/00 |
| | | | 220/288 |
| 8,548,112 B2 * | 10/2013 | Singh | G21F 5/005 |
| | | | 250/506.1 |
| 8,712,001 B2 * | 4/2014 | Singh | G21F 5/005 |
| | | | 250/505.1 |
| 9,396,824 B2 * | 7/2016 | Agace | G21F 5/005 |
| 9,514,853 B2 * | 12/2016 | Singh | G21F 5/008 |
| 9,865,366 B2 * | 1/2018 | Lehnert | G21F 5/12 |
| 2010/0284506 A1 | 11/2010 | Singh | |
| 2014/0039235 A1 * | 2/2014 | Subiry | G21F 5/012 |
| | | | 588/16 |
| 2015/0069274 A1 | 3/2015 | Agace | |

* cited by examiner

SECTION F-F

SECTION H-H

SECTION I-I

SECTION J-J

SECTION B-B

SECTION A-A

NUCLEAR FUEL DEBRIS CONTAINER

CLAIM OF PRIORITY

This application claims priority to and the benefit of provisional application No. 62/302,363, filed Mar. 2, 2016, which is incorporated herein by reference in its entirety.

FIELD OF THE INVENTION

The embodiments of the present disclosure generally relate to safely storing radioactive debris, such as corium, nuclear fuel rod assemblies and parts thereof, etc.

BACKGROUND

The Fukushima Daiichi Nuclear Power Plant (IF) Unit I to 3 in Japan, owned and operated by Tokyo Electric Power Company (TEPCO), suffered tremendous damage from the East Japan Great Earthquake that occurred on Mar. 11, 2011. It is assumed that nuclear fuels in the 1F reactors experienced melting and, as a result, dropped to the bottom of the Reactor Pressure Vessel (RPV) and/or Pressure Containment Vessel (PCV), solidifying there as fuel debris after being fused with reactor internals, concrete structures, and other materials.

In order to pursue decommissioning of 1F, it is necessary to remove the fuel debris from the RPV/PCV using appropriate and safe Packaging, Transfer and Storage (PTS) procedures. Fuel debris retrieval procedures are expected to be started within 10 years' time and completed in 20 to 25 years' time. It is planned that after 30-40 years the fuel debris will all be placed in interim storage.

SUMMARY OF THE INVENTION

Embodiments of containers and methods are provided for safely removing and storing radioactive debris.

One embodiment, among others, is a canister that is designed to safely house and contain radioactive debris in water or air so that the radioactive debris cannot achieve criticality. The canister has an elongated cylindrical body extending between a top end and a bottom end, a planar bottom part at the bottom end, an open top at the top end, and a circular planar lid mounted over the open top. The canister has a diameter that is no greater than about 49.5 centimeters (cm) and an interior axial length that is no greater than 381.0 cm so that the radioactive debris cannot achieve nuclear criticality. Furthermore, it is assumed that the radioactive debris contains an amount of uranium dioxide (UO2) fuel that is no greater than about 100 kilograms (kg) and that has an initial enrichment of the UO2 fuel that is not greater than about 3.7 percent.

Another embodiment, among others, is a canister that is designed to safely house and contain radioactive debris in water or air so that the radioactive debris cannot achieve criticality. The canister has the features described in the previous paragraph but additionally has an elongated flux trap inside of the canister. The flux trap causes an interior of the canister to be divided into a plurality of sectors. The flux trap has open interior regions that may be lined with a neutron absorber and, when the canister is in water, the open interior regions contain water. The flux trap serves to slow down neutron movement, which in turn limits undesired neutron multiplication, thus assuring sub-criticality. This embodiment enables containment of one to four, damaged or undamaged, partial or whole, nuclear fuel rod assemblies in each sector.

Another embodiment, among others, is a basket that is designed to safely house and contain radioactive debris in water or air so that the radioactive debris cannot achieve criticality. The basket has a plurality of elongated cylindrical canisters that are in parallel along their lengths. Each of the canisters has an elongated cylindrical body extending between a top end and a bottom end, a planar bottom part at the bottom end, an open top at the top end, and a circular planar lid mounted over the open top. Each of the canisters has a diameter that is no greater than about 49.5 cm and an interior axial length that is no greater than 381.0 cm so that the radioactive debris cannot achieve nuclear criticality. Furthermore, it is assumed that the radioactive debris contains an amount of UO2 fuel that is no greater than about 100 kg and that has an initial enrichment of the UO2 fuel not greater than about 3.7 percent.

Another embodiment, among others, is a container that is designed to safely house and contain radioactive debris in water or air so that the radioactive debris cannot achieve criticality. The container has an overpack having an elongated cylindrical body extending between a top end and a bottom end, a planar bottom part at the bottom end, an open top at the top end, and a circular planar lid mounted over the open top. A basket is situated inside of the overpack. The basket has a plurality of elongated cylindrical canisters that are in parallel along their lengths. Each of the canisters has an elongated cylindrical body extending between a top end and a bottom end, a planar bottom part at the bottom end, an open top at the top end, and a circular planar lid mounted over the open top. Each of the canisters has a diameter that is no greater than about 49.5 cm and an interior axial length that is no greater than 381.0 cm so that the radioactive debris cannot achieve nuclear criticality. Furthermore, it is assumed that the radioactive debris contains an amount of UO2 fuel that is no greater than about 100 kg and has an initial enrichment of the UO2 fuel is not greater than about 3.7 percent.

Another embodiment, among others, is a container for safely storing radioactive debris in water or air so that the radioactive debris cannot achieve criticality. The container has an overpack with an elongated cylindrical body extending between a top end and a bottom end, a planar bottom part at the bottom end, an open top at the top end, and a circular planar lid mounted over the open top. A basket is situated inside of the overpack. The basket has a plurality of elongated cylindrical canisters that are in parallel along their lengths inside the basket. Each of the canisters has an elongated cylindrical body extending between a top end and a bottom end, a planar bottom part at the bottom end, an open top at the top end, and a circular planar lid mounted over the open top. Each of the baskets has an internal diameter that is no greater than about 49.5 cm and an interior axial length that is no greater than about 381.0 cm. At least one of the canisters has an elongated flux trap, causing an interior of the canister to be divided into a plurality of sectors. The flux trap has one or more open interior regions with air to slow down neutron movement. The canister having the flux trap has radioactive debris in at least one of its sectors. Because of the flux trap, the sectors can be loaded with radioactive debris having any amount of uranium dioxide (UO2) fuel and at any initial enrichment. Furthermore, one to four nuclear fuel rod assemblies, in whole or in part, can be loaded into each sector having the flux trap.

Other apparatus, methods, apparatus, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a cross-sectional view of the second embodiment of the canister of FIG. 1B with its lid.

DETAILED DESCRIPTION

Figures 1A, 1B, 1C:
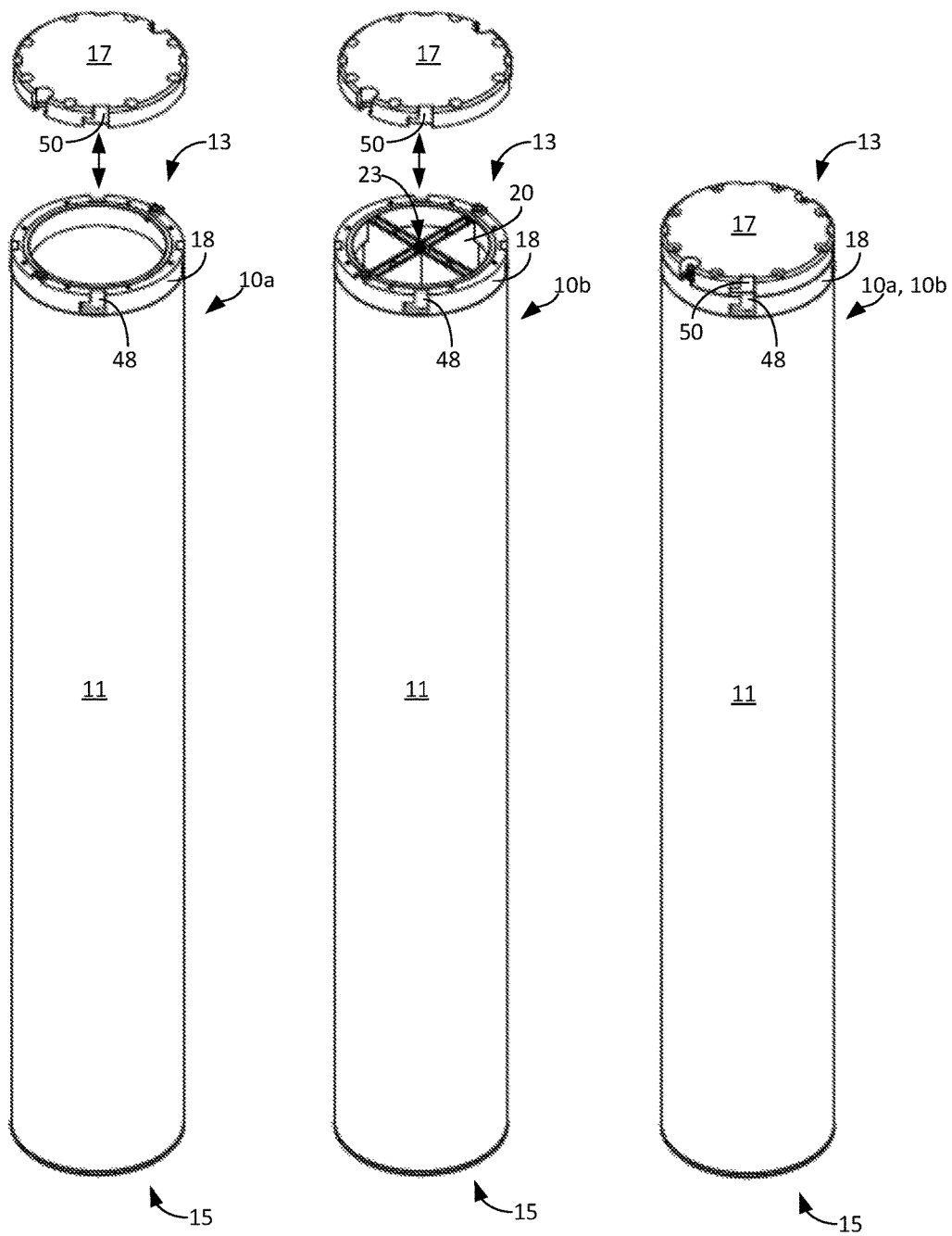
FIG. 1A is a perspective view of a first embodiment (open design) of a canister, shown with an unmounted lid.
FIG. 1B is a perspective view of a second embodiment (cruciform, or segmented, design) of a canister, shown with an unmounted lid.
FIG. 1C is a perspective view of the first or second embodiment of the canister of FIG. 1A or FIG. 1B, respectively, shown with a mounted lid.

In order to establish PTS systems for IF fuel debris, procedures need to be formulated based on the nuclear fuel debris conditions, regulatory requirements, and Reactor Pressure Vessel (RPV) and Primary Containment Vessel (PCV) internal conditions. This entails full consideration of criticality prevention when handling nuclear fuel materials, the prevention of hydrogen explosion, and the evaluation of all other relevant safety-related functions.

It is planned that fuel debris retrieval procedures will be implemented with the PCV filled with water, in order to shield against radiation and to prevent the dispersion of radioactive materials. To maintain sub-criticality during PTS procedures, IF fuel debris will be secured in canisters having a controlled internal diameter.

Once fuel debris has been packaged securely in a fuel debris canister, some water also may be contained within the canister. Hydrogen generation through radiolysis of the water therefore is possible. To prevent a hydrogen explosion when handling fuel debris canisters, the canister includes a mesh type filter to allow the release of any hydrogen so generated in the canister. It is considered possible that nuclear fissile materials from fuel debris may be released along with the hydrogen from this filter. The fuel debris canister with filter must be designed to maintain sub-criticality (e.g., in a wet pool environment) even if nuclear fissile materials are released from the canister. The deployment of equipment to take away hydrogen and nuclear fissile materials released from the canisters also is a possibility.

A. Overview of Process

The following is an overview of the debris packaging and subsequent management of the loaded debris canisters.

1. Canister Loading

The loading of fuel debris into the canisters will be performed adjacent to the reactor pressure vessel. After filling, a lid will be placed on the canister (not bolted) and then it will be transferred through the existing water channel to the reactor spent fuel pool. Neutron monitors located adjacent to the canister loading station will be available, if necessary, to infer reactivity of the canister during loading, to ensure that loading of debris does not violate the specified margin to criticality. Also, a portable weighing platform should be available, so that loading of debris can be halted if the specified weight limit otherwise would be violated.

Filled canisters will be received in the reactor spent fuel pool and located in racks that will hold five canisters. These racks will be the baskets to be used inside a metal overpack, which later will be loaded first into a transfer cask, even later potentially into a transport cask and, ultimately, into a ventilated concrete dry storage cask for long-term interim storage.

At this point, the debris inside the canister will be fully immersed in water and hydrolysis will result in the generation of hydrogen. The canisters will include a ventilation pipe to allow the release of such hydrogen, and this will enable the connection of the canister to an external hydrogen/off-gas processing and collection equipment. There should be sufficient floor space to locate such equipment adjacent to the reactor spent fuel pool and its primary functions will be as follows: (a) gases and moisture vapor from the canisters first will enter a Cyclone Moisture Separator; (b) the remaining gases will be directed to a Duplex Filter Monitoring Assembly (DFMA); (c) the filtered gases will be collected in a Gas Collection Header (GCH); and (d) collected gases will be discharged to a Plant Ventilation System (PVS).

The debris canister will include a second penetration line for use in draining and/or purging the canister. During this initial period of storage this second line will enable a purge with helium gas should the hydrogen generation, for any reason, increase beyond the Lower Explosive Limit (LEL) concentration. Each line from the canisters will be monitored in order to provide an alert to any unacceptable operating conditions.

2. Reactor Spent Fuel Pool: Draining and Drying of the Debris Canisters

As and when it is deemed appropriate, each basket holding five debris canisters will be transferred to another location in the reactor spent fuel pool (the canister processing station) where the group of five canisters will be connected to an external canister processing system. This will drain the water out of each canister and then will purge each canister with helium at approximately 150° Celsius, in order to drive out almost all of the moisture. Once this has been achieved, if necessary the basket of five canisters can be returned to its original storage location in the pool, where it can be connected again to the external gas removal and processing system. It can remain there until such time as transfer to another storage location is implemented. In this relatively dry condition, the generation of hydrogen through hydrolysis will have been reduced substantially. Alternatively, the canisters can be immediately packaged in an over-pack and transfer cask to remove the debris canisters from the reactor spent fuel pool.

3. Transfer Out of the Reactor Spent Fuel Pool

Prior to transfer out of the reactor pool, the basket will be loaded into a metal overpack that itself already has been loaded into a transfer cask. At this point, the overpack will be fitted with a temporary shielding lid. Via penetrations in this temporary lid, the drain line on the canister will be closed off, and an external filter will be attached to the off-gas penetration line. The temporary lid will be replaced by a final closure lid, of either bolted or welded design, depending on the expected next stage in the management of the debris. If the intention is to make an on-site transfer to, for example, a common AFR (away from reactor) wet pool, then the closure lid would be bolted. If the intention is to transfer directly to AFR (off-site) interim dry storage, then the closure lid would be welded.

The welded closure would include a simple closure plate for the period of off-site transportation. Once at the storage location, this would be replaced by an external filter. The bolted closure could include just a simple cover plate if the canisters were to be taken out of the over-pack and stored again in a wet pool environment. Alternatively, if there was concern that a significant time interruption might occur during the transfer, it also could include an external filter.

The metal overpack will be drained and dried prior to moving on to the next phase of operations (wet pool or dry storage).

4. Key Features of the Debris Canister

Two canister variants are disclosed. The first is an open structure with no internal subdivision to facilitate loading with debris and ultimately an expected higher packing density compared with what would be achieved with a smaller diameter canister. The second includes a cruciform internal sub-divider, in case any substantively intact fuel assemblies are recovered from the reactor core; (the sub-divider will help to facilitate ease of loading for up to four such intact or partially intact fuel assembly pieces) and/or to deal with debris that may have a concentration of enriched uranium that is higher than the estimated average debris mixture, which may not be subcritical in the open canister design. Full details of the basis for the proposed canister size and how sub-criticality can be assured, are provide later in this document.

Prior to the canisters being drained, dried and packaged in an overpack, they will not include any sort of integral filter. During these phases of debris management, externally fitted filters will be utilized, exclusively, as and when appropriate.

The canisters also will not feature any sort of hydrogen absorption material or other hydrogen control device. It has been determined that the inclusion of a hydrogen getter inside the canister, for example, would not be helpful. Any such getter would be saturated after a relatively short period of time and thereafter would not be able to contribute to the management of hydrogen release from the debris.

B. Assurance of Sub-Criticality

The quantities of various materials that will be contained in the mixed debris to be recovered and loaded into canisters has been estimated. For debris that may still be located inside the pressure vessel, this will tend to be mainly uranium mixed with some metallic structural materials (fuel cladding, BWR channel, BWR assembly components, possibly control rod blades and potentially some reactor structural materials). For debris that has penetrated the pressure vessel and fallen onto the base of the concrete containment, the mixture is expected to include concrete and some additional steel and other metals (from things like the pressure vessel, the lower core plate and the control rod drive mechanisms below the pressure vessel).

In order to perform the best calculations, it would be necessary to take samples from the core debris, which could be analyzed to provide accurate information about the typical composition, or range of compositions that might be expected. In the absence of such information, preliminary calculations have been performed based on an assumed mixture of UO2 with carbon steel in various plausible ratios, based on the approximate information presented in Table A.

TABLE A

| Material | kg |
|---|---|
| $UO_2$ in Fuel Bundle | 200 |
| Components per Bundle (including channel) | 90 |
| Portion of control rods (100 kg each and 1 per 4 bundles | 25 |
| Miscellaneous other materials in the debris mix | 50 |
| Total per initial fuel assembly bundle | 365 |
| Percentage $UO_2$ in Total Debris Material | 55% |

The average enrichment of the uranium in the core at the time of the accident is assumed to have been 3.7 percent $U^{235}$. This is the typical average assembly enrichment for fresh assemblies loaded into the core. Individual rods and pellets will have had initial enrichments up to 4.95 percent $U^{235}$. In practice some of the fuel in the core will have experienced significant burnup, so the assumption of an average of 3.7 percent is considered to be a conservative assumption in respect of evaluating reactivity.

Initial criticality calculations have been performed assuming the extremely conservative assumption of a homogeneous mixture of uranium and other materials in various ratios. A $K_{eff}$ value of 0.95 is used as the maximum allowed reactivity at the +2σ level. With UO2 content of 55 percent, under these conservative conditions, reactivity reaches a peak value just below the limit of $K_{eff}=0.95$ when about 250 liters of debris has been loaded into the canister. As more debris is added, expelling water (moderator), reactivity then reduces slightly.

If, however, the portion of UO2 in the debris mix is increased to 60 percent, then the 0.95 limit is estimated to be exceeded when about 200 liters of debris has been loaded in the canister. This would not be acceptable, even if the reactivity coefficient would reduce as the canister was filled up more. Since the estimated portion of 55 percent UO2 is subject to large uncertainty, clearly this preliminary criticality assessment leaves corresponding uncertainty regarding the ability to fill up the canister with 1F debris.

In reality, however, the debris recovered and submitted for loading in the canisters is expected to be in the form of relatively large pieces of material that have been fused at high temperature. In other words, the debris/water mix in the canister will be highly heterogeneous. Accordingly, calculations have been performed assuming a heterogeneous mixture of debris and water, with pieces of debris in various physical forms. With these more realistic assumptions, it has been calculated that the canister can be fully loaded with UO2 and other material in any ratio from about 55:45 to about 70:30 and $K_{eff}$ reaches no more than about 0.5, far below the 0.95 limiting value.

It is recognized however that debris with an enriched uranium concentration higher than the average for all debris could be recovered and submitted for loading into an individual canister. In the limit there could be hot-spots of entirely enriched uranium material. For pure enriched uranium, the maximum amount that could be loaded into the canister without violating reactivity limits would be small. This would be picked up by the proposed neutron monitoring equipment providing an alert for the operators.

At this point, a decision would be required on how to proceed. One option would be to load only the relatively small quantity of high uranium content debris, meaning that the canister volume would be underutilized. This would be acceptable technically, but an economic penalty would be incurred (more canisters to purchase, handle, transport and store). An alternative would be to load such material into a canister of a modified design, as described hereinafter as the cruciform design.

C. Embodiments

FIG. 1A is a perspective view of a first embodiment (open design) of a canister 10 of the present disclosure and is generally denoted by reference numeral 10a. The canister 10a has an elongated cylindrical body 11 extending between a top end 13 and a bottom end 15. There is a planar bottom part welded to the body 11 at the bottom end 15. The open top at the top end 13 is designed to receive a circular planar lid 17, which can be welded or bolted to the body 11.

In the preferred embodiment, the closure lid is a single piece lid design that is secured to the canister 10a using cone bolts, which can be operated using long handled underwater tools. The closure lid 17 is engaged and handled using a grapple tool that can also be used to handle the canister 10a. Once the closure lid 17 is fully installed and all of the bolts are properly torqued, the closure lid 17 can be engaged with the grapple tool to facilitate handling of the loaded canister.

The closure lid 17 is sealed to the upper head by use of an o-ring suitable for the designed configuration. The canister 10a accommodate the continuous passage of off-gases from the contained fuel debris. Accordingly, a traditional leak tight sealing configuration is not required. However, due to the fact that the canister 10a will be in underwater storage, a water tight configuration is needed. The canister 10a has a diameter that is no greater than about 49.5 cm, or about 19.5 inches, and an interior axial length that is no greater than about 381.0 cm, or about 150.0 inches, so that the radioactive debris cannot achieve nuclear criticality (or an undesirable nuclear reaction). In other words, the fuel debris is cut into small pieces and the pieces must be small enough to fit into the canister 10a, which ensures that they will not achieve unwanted nuclear criticality. Furthermore, it is assumed that the radioactive debris in each canister 10a contains an amount of uranium dioxide (UO2) fuel that is no greater than about 100 (kg, and an initial enrichment of the UO2 fuel is not greater than about 3.7 percent. It is further assumed that the canister 10a is fully loaded with the UO2 fuel and one or more other nonradioactive materials (e.g., carbon steel) in any volumetric ratio from 55:45 to 70:30, respectively. Further note that no nuetron absorber is needed in the first embodiment of the canister 10 to avoid unwanted nuclear criticality.

Figure 2:
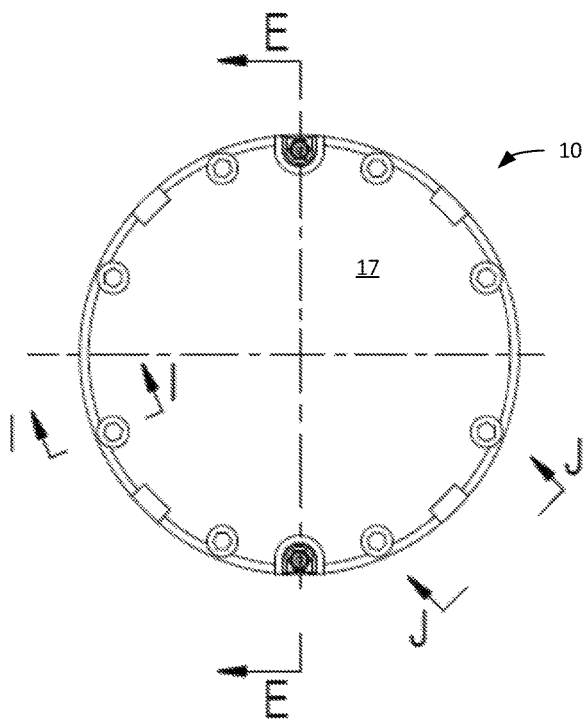
FIG. 2 is a top view of the canister of FIG. 1A or FIG. 1B with its lid.
Figure 6:
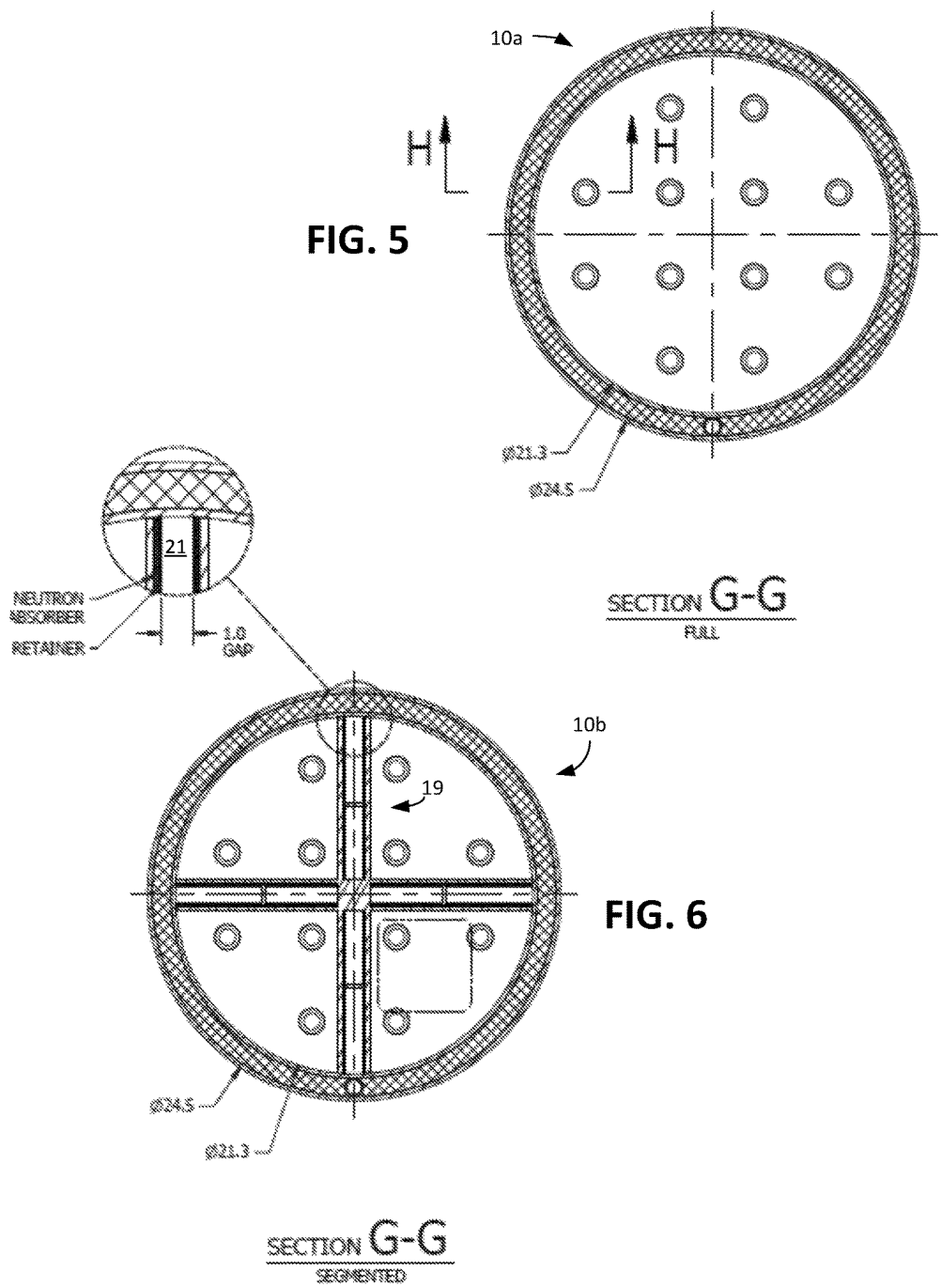
FIG. 6 is a cross-sectional view of the second embodiment of the canister of FIG. 1B taken along sectional line G-G of FIG. 3.

FIG. 1B is a perspective view of a second embodiment (cruciform, or segmented, design) of a canister 10 of the present disclosure and is generally denoted by reference numeral 10b. The canister 10b has an elongated cylindrical body 11 extending between a top end 13 and a bottom end 15. There is a planar bottom part welded to the body 11 at the bottom end 15. The open top at the top end 13 is designed to receive a circular planar lid 17, which is bolted to the body 11. Unlike the canister 10a of FIG. 1A, the canister 10b further includes a flux trap 19 that has a plurality of spokes 20 with internal channels 21, or pockets, extending outwardly from a central elongated hub support 23. These channels 21 are filled with water when the canister 10b is in water and filled with air when the canister 10b is removed from the water and permitted to drain. The flux trap 19 has a cross-shaped cross-section, as is shown in FIG. 2. The cross-sectional width, or gap, of the rectangular channels 21 is preferably no less than about 2.54 cm, or about 1.0 inch. Reducing the gap down to about 0.75 inch produces a max Keff of about 0.938. A nominal gap of 1 inch produces a max Keff of about 0.907. Furthermore, the interior walls of the spokes includes a neutron absorber (FIG. 6). The combination of the gap and neutron absorber accommodate full loading of fuel debris, even if it were assumed to be all uranium material with 3.7 percent $U^{235}$ in an optimal ratio of uranium to water (i.e., maximum reactivity configuration). Thus, in this embodiment, the canister 10b can contain radioactive debris with any amount of uranium dioxide (UO2) fuel at any initial enrichment and at any volumetric ratio with one or more other materials.

In essence, the flux trap 19 and neutron absorber slow down neutrons so that the neutrons are too slow to meaningfully affect the fission process in a non-thermalized condition. The flux trap 19 is particularly important when the canister 10*b* is in water. As a result of the flux trap 19, the canister 10*b* has four sectors, each of which can receive fuel debris, such as corium, or in the alternative, up to four nuclear fuel rod assemblies in whatever condition (unlike the first embodiment, which is not designed to contain such assemblies). The canister 10*b* has a diameter that is no greater than about 49.5 cm, or 19.5 inches, and an interior axial length that is no greater than about 381.0 cm, or about 150.0 inches, so that the radioactive debris cannot achieve unwanted nuclear criticality.

FIG. 2 is a top view of the canister 10 of respective FIG. 1 with its lid 17. FIG. 3 is a cross-sectional view of the second embodiment of the canister 10*b* of FIG. 1B with its lid 17. The first embodiment of the canister 10*a* would look similar except that it would not include the flux trap 19.

Figure 4:
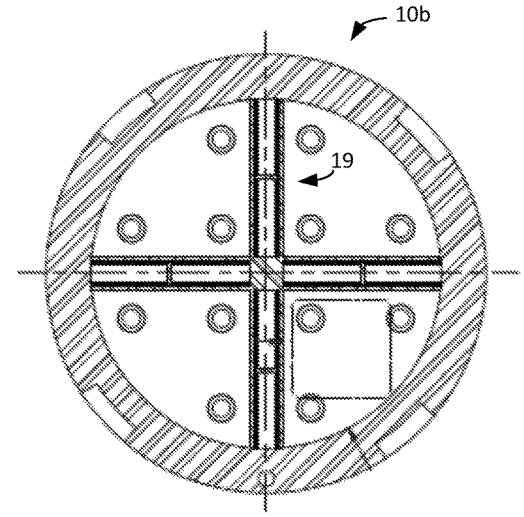
FIG. 4 is a cross-sectional view of the second embodiment of the canister of FIG. 1B taken along sectional line F-F of FIG. 3.

FIG. 4 is a cross-sectional view of the second embodiment of the canister 10*b* of FIG. 1B taken along sectional line F-F of FIG. 3.

Figure 5:
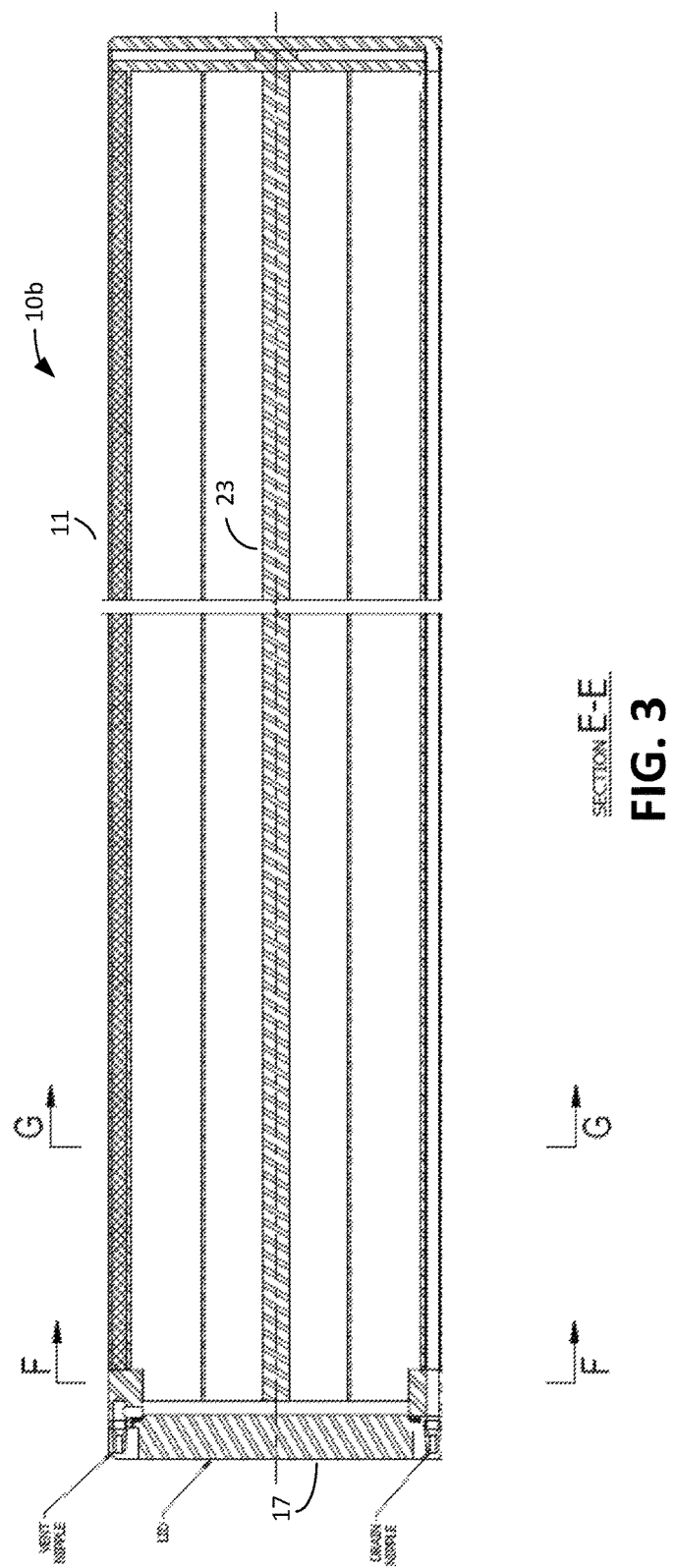
FIG. 5 is a cross-sectional view of the first embodiment of the canister of FIG. 1A taken along sectional line G-G of FIG. 3.
Figure 7:
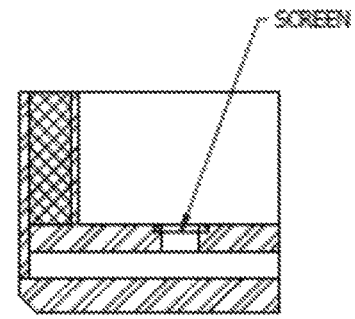
FIG. 7 is a cross-sectional view of detail H-H of FIG. 5 showing a screen.

FIGS. 5 and 6 are cross-sectional views of the first and second embodiments of the canister 10 of FIG. 1A and FIG. 1B taken along sectional line G-G of FIG. 3. FIG. 7 is a cross-sectional view of detail H-H of FIG. 5 showing a debris screen. As shown in FIG. 1B, the flux trap 19 associated with the canister 10*b* may optionally include a neutron absorber on its interior walls of channels 21 that is held in place by a suitable retainer.

Figure 8:
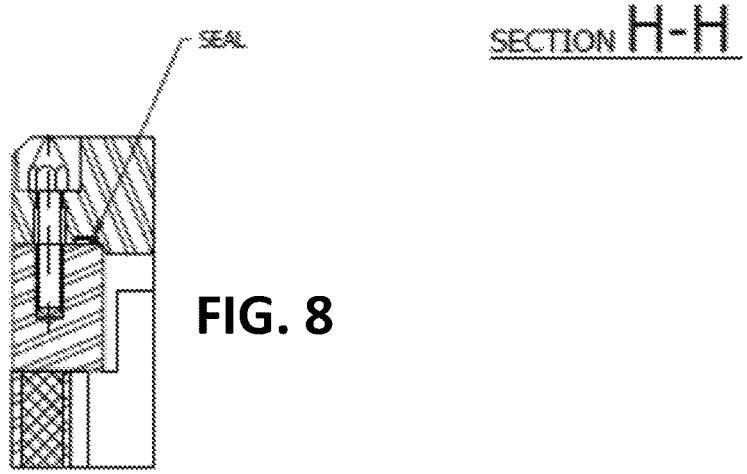
FIG. 8 is a cross-sectional view of detail I-I of FIG. 2 showing a debris seal.
Figure 9:
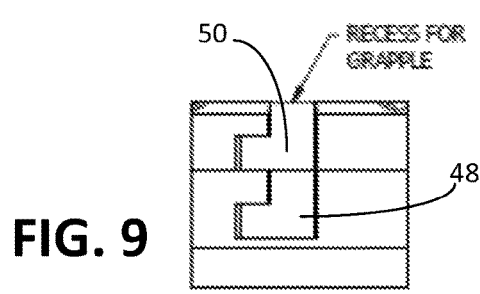
FIG. 9 is a cross-sectional view of detail J-J of FIG. 2 showing a recess for a canister grapple.

FIG. 8 is a cross-sectional view of detail I-I FIG. 2 showing a debris seal. FIG. 9 is a cross-sectional view of detail J-J of FIG. 2 showing a recess for a canister grapple.

Figure 10:
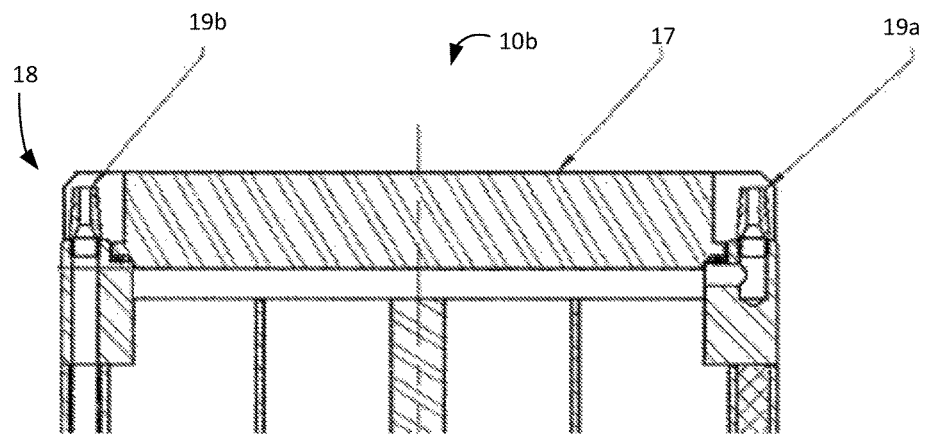
FIG. 10 is a cross-sectional view of the upper head closure of the canisters of FIGS. 1A and 1B.
Figure 24:
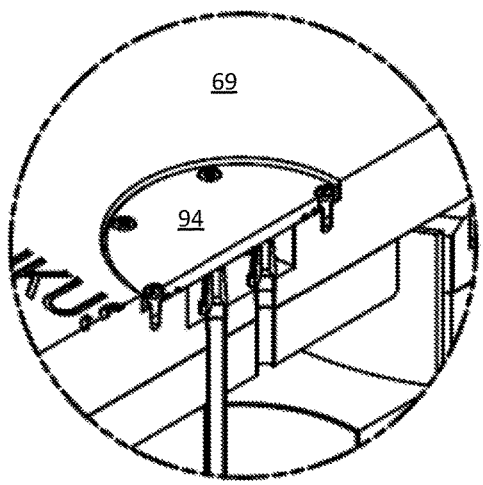
FIG. 24 is a partial enlarged view showing detail C-C of FIG. 21 involving use of a filter when the container is in a storage configuration.

Details of an upper closure head 18 engaged with the lid 17 is shown in FIG. 10. The inner and outer shells are sealed at the top end 13 by an upper head ring. The space between the inner and outer shells provides a means to install the vent and drain connections. The vent connection is necessary to process off-gasses and to connect the canister 10 to monitoring equipment. The vent permits hydrogen to escape from the canister 10 while preventing radioactive gases, for example, krpton (Kr), iodine (I2), etc., from escaping. The escaping gases enter the overpack 61 (FIG. 17), and then escape the overpack 61 via a filter 92 (FIG. 24). This vent port 19*a* is configured so as to minimize radiation streaming while ensuring the upper most portion of the canister 10 is being accessed by processing or monitoring equipment. The drain port 19*b* extends to the bottom of the canister 10, to facilitate draining of water. The upper closure head 18 provides a seating surface for the thick bolted closure lid 17, which in the preferred embodiment, is 8.38 cm, or 3.3 inches.

Figure 11:
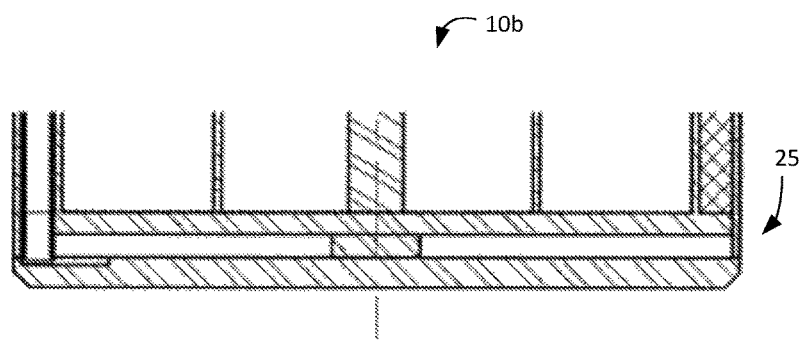
FIG. 11 is a cross-sectional view of the lower head closure of the canisters of FIGS. 1A and 1B.
Figure 12:
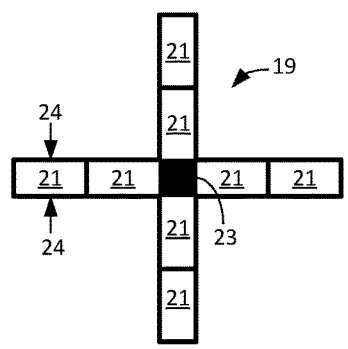
FIG. 12 is a cross-sectional view of a flux trap that extends along the interior of the second embodiment of the canister of FIG. 1B.

Details of a lower closure head 25 is shown in FIG. 11. The canister inner shell incorporates 12 screened holes in its bottom plate, to allow liquid drainage yet still retains fine debris particles. The screen material to be fitted to these holes will retain materials exceeding 250 microns in size, which is a typical screen size for this type of application. The escaping liquid enters the overpack 61 (FIG. 17), and then is drained from the overpack 61. Any smaller particulate matter that passes through these screens will be captured and processed in external equipment that will be connected to the canisters 10 while they are in pool storage.

Figure 14:
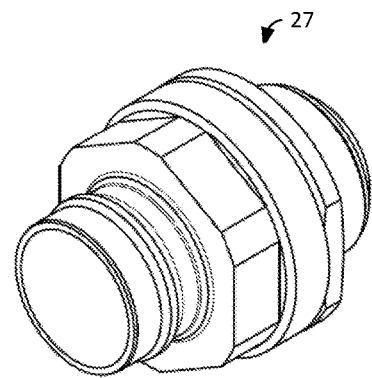
FIG. 14 is a perspective view of a drain and vent port that is associated with the canister just prior to installation in an overpack.

Access to the internal cavity of the canister 10 is controlled by vent and drain port fittings that are completely independent from the bolted closure lid 17. Each port fitting is a spring loaded poppet-style fitting 27, as illustrated in FIG. 14, which has been used in underwater applications where specially designed quick couplings play a vital role. Examples of this application are in oil, gas, and other deep water projects, as well as quick disconnects that have operated on space vehicles, beginning with the earliest NASA programs.

Upon completion of draining and drying of the canister 10 and just prior to installation into the overpack 61 (FIG. 17), a filtered cap assembly will be installed on both the vent and drain port fittings. This type of filter assembly ensures that any particulate material (less than 1 micron) will be retained within the canister 10, while allowing any hydrogen or other off gas to escape the canister 10.

Figure 13:
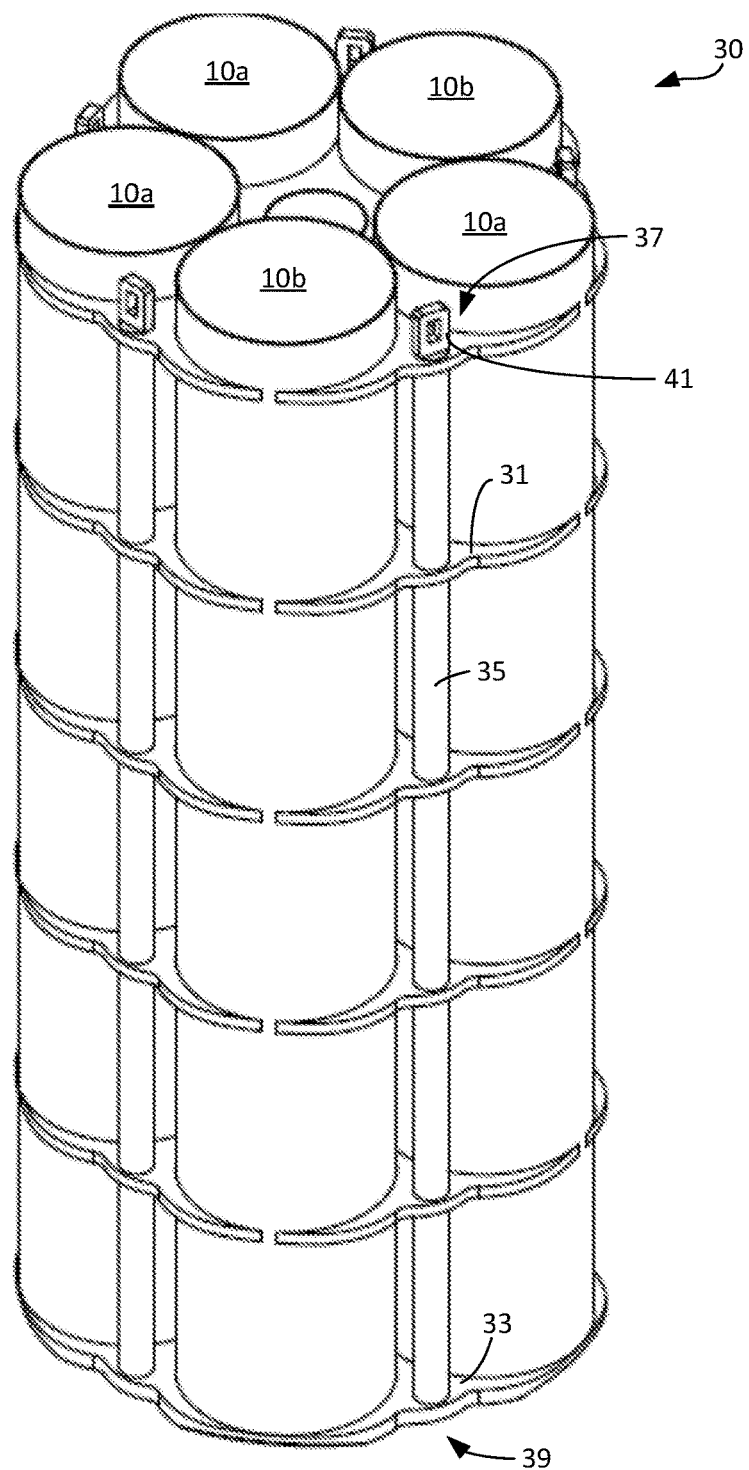
FIG. 13 is a perspective view of a basket that corrals and confines a plurality of the canisters of FIG. 1.

FIG. 13 is a perspective view of a basket 30 that corrals and confines a plurality of the canisters 10 of FIG. 1 in a parallel configuration along their lengths. In FIG. 3, as a non-limiting example, the basket 30 is shown to have three canisters 10*a* and two canisters 10*b*. The basket 30 has a plurality of spaced parallel corral plates 31 that confine the plurality of elongated cylindrical canisters 10. Each of the corral plates 31 has a plurality of circular apertures to receive a respective canister 10 through it, except for the bottom plate 33, which is without the apertures. A plurality of elongated lifting bars 35 are distributed equally around a periphery of the basket 30 and extend along the plurality of elongated cylindrical canisters 10. Each of the lifting bars 35 has a top end 37 and a bottom end 39. Each of the lifting bars 35 has an eye hook 41 located at the top end 37. The bars 35 are attached to the plates 31 and 33.

Figure 15:
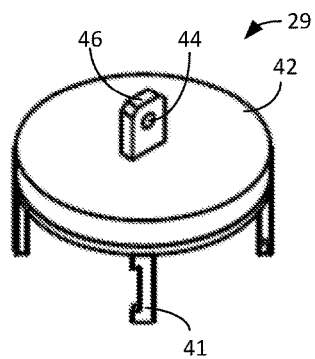
FIG. 15 is a perspective view of a canister grapple that can be used to lift the canister and canister closure lid.

FIG. 15 is a perspective view of a four legged canister grapple 29 that can be used to move the canister 10 as well as the lid 17. The canister grapple 29 has a plurality of legs 41, which total four in this example and which extend downwardly from a circular planar body 42. Each of the legs 41 is C-shaped, as shown. The canister grapple 29 is connected to the overhead crane system via an eye 44 in an eye hook assembly 44 that extends upwardly from the body 42. Ideally, an extension beam is used to connect the grapple to the overhead crane hoist (so as to keep the crane hook dry), but this depends on whether or not there is sufficient overhead height for the crane arrangement currently installed at the reactor in question. The overhead crane hoist hook should have a rotation device for rotating the crane hook to the required polar location. The canister grapple 29 is lowered such that the legs 41 of the canister grapple 29 enter into the L-shaped slots 48 and 50 on, respectively, the canister 10 or canister closure lid 17. Once lowered into position, the canister grapple 29 will be rotated to engage the dogs on the grapple legs with the corresponding openings on the canister 10 or canister lid 17. Once the canister 10 or canister lid 17 has been relocated to the desired location, the canister grapple 29 is disengaged from either the slots 48 or 50 by first rotating it in the other rotational direction, and then lifted it up and away.

Figure 16:
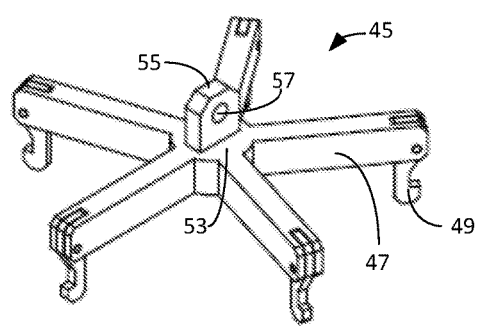
FIG. 16 is a perspective view of a basket spider grapple that can be used to lift the basket of FIG. 13.

FIG. 16 is a perspective view of a basket spider grapple 45 that can be used to lift the basket 30 of FIG. 13. The basket spider grapple 45 has a plurality of arms 47, which total five in number in this example and which extend outwardly from a central body 53. Each of the five arms 47 has an L-shaped, outwardly open hook 49 that is designed to engage a respective lifting bar eye hook 41 so that the basket 30 can be lifted and moved, e.g., so that the basket 30 can be placed in or removed from an overpack 61 (FIG. 9). Furthermore, the spider grapple 45 has a lifting eye assembly 55 that extends upwardly from the central body 53. An eye 57 can be used by an overhead crane (not shown) to move the spider grapple 45 as well as an attached basket 30.

Figure 17:
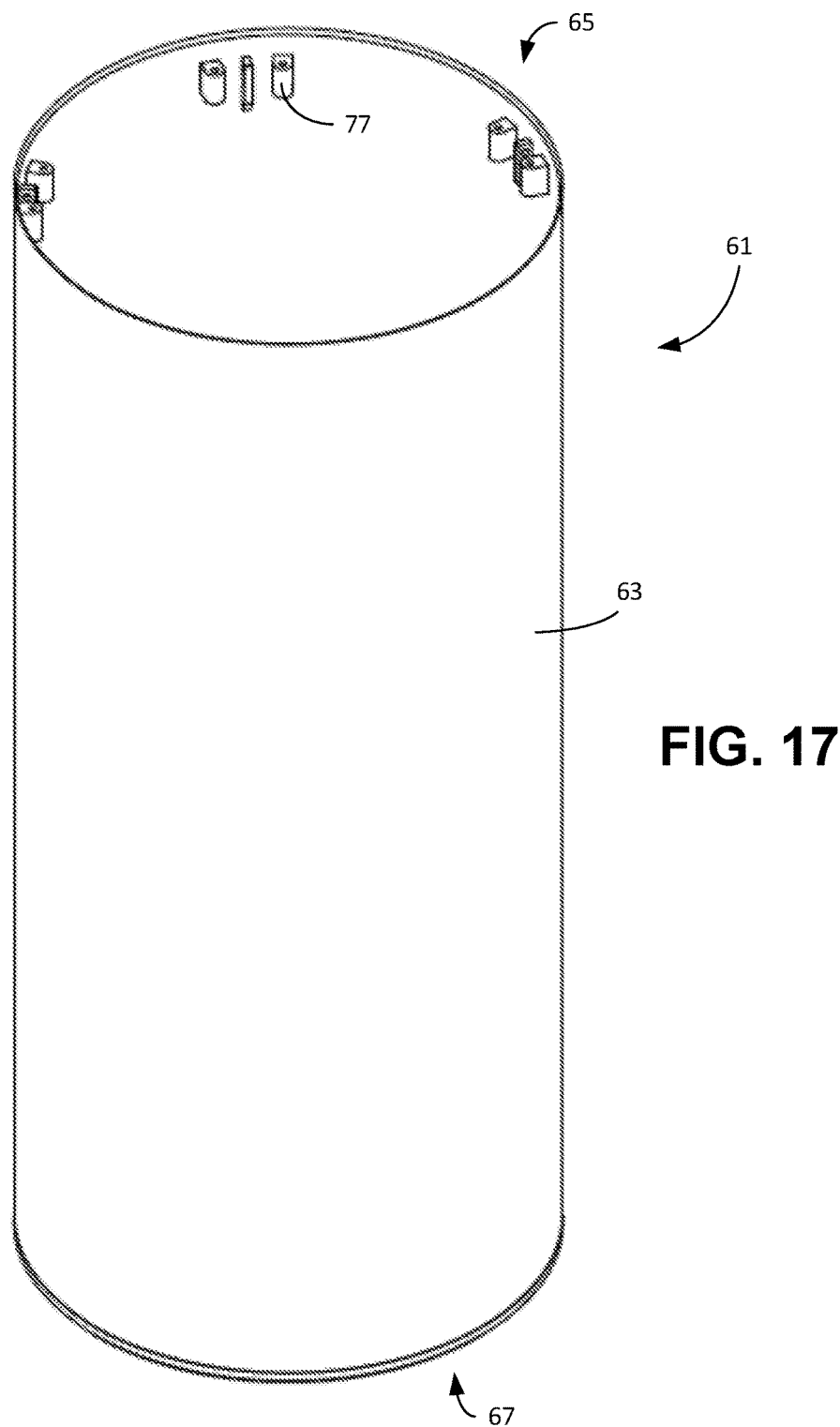
FIG. 17 is a perspective view of an overpack, without its lid, into which is placed the basket of FIG. 13.
Figure 18A:
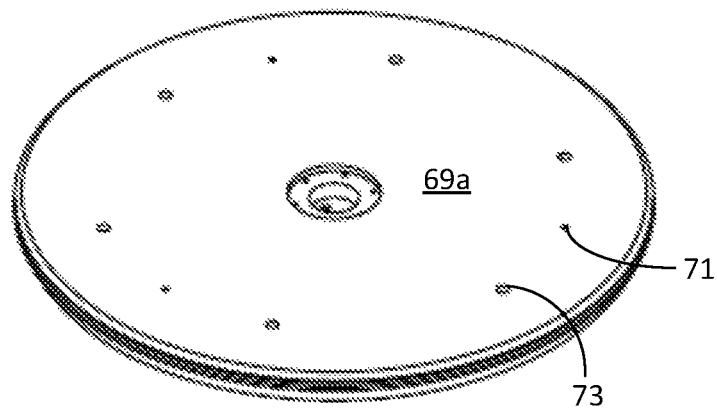
FIG. 18A is a first embodiment of a lid that can be mounted on the overpack of FIG. 5A.
Figure 18B:
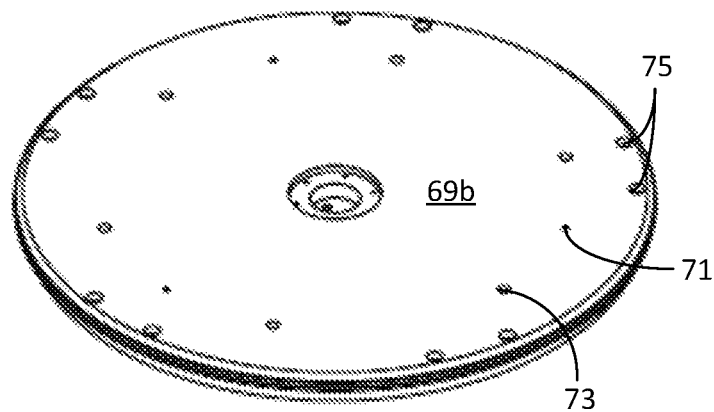
FIG. 18B is a second embodiment of a lid that can be mounted on the overpack of FIG. 5A.

FIG. 17 is a perspective view of an overpack 61, without its lid, into which is placed the basket 30 of FIG. 13. The overpack 61 has an elongated cylindrical body 63 extending between a top end 65 and a bottom end 67. There is a planar bottom part welded or bolted to the body 63 at the bottom end 67. An open top at the top end 65 is designed to receive a circular planar lid 69, first and second embodiments of which are shown in FIG. 18A and FIG. 18B and designated by respective reference numerals 69a and 69b. Each of the lids 69a and 69b has a plurality of holes 71 through which air or water passes as wells as a plurality of threaded holes 73 that provide a means for enabling the overhead crane to move the overpack 65 with the contained basket 30 and canisters 10 with, for example, lifting lugs. The lid 69a of FIG. 18A is designed to be welded to the body 63. As an alternative, the lid 69b of FIG. 18B is designed to be bolted to the body 63 via bolt holes 75. Bolts (not shown) are passed through respective holes 75 in the lid 69b and then into respective threaded assemblies 77, as shown in FIG. 17, that are welded or otherwise attached to the interior of the body 63. In some embodiments, an inflatable seal can be positioned around the periphery of the lid 69a or 69b prior to placement on the overpack 61.

Figure 19:
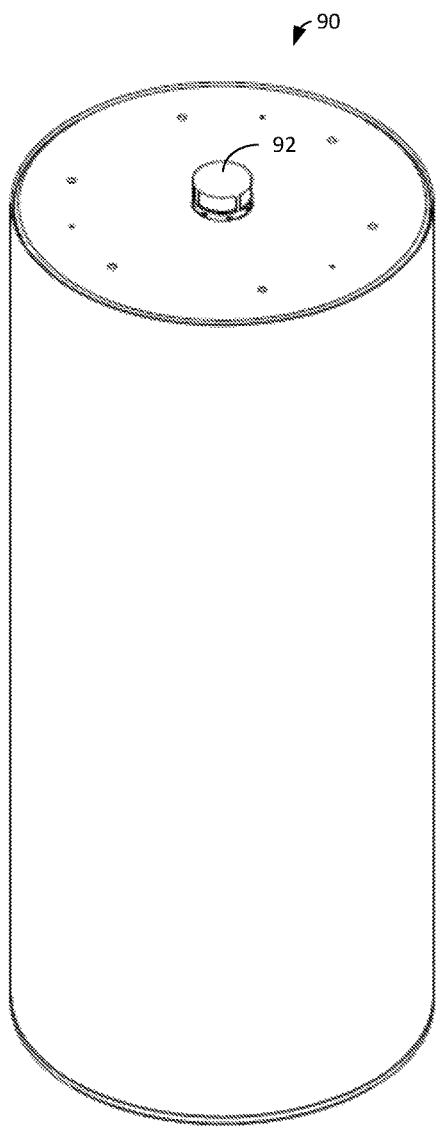
FIG. 19 is a perspective view of a container having the overpack containing the basket containing the canisters.

FIG. 19 is a perspective view of a container 90 having the overpack 61 containing the basket 30 containing the canisters 10. The container 90 is shown with a welded lid 69a (FIG. 18A). The container 90 is also shown with a filter 92, which is used when the container 90 is in a storage configuration.

Figure 21:
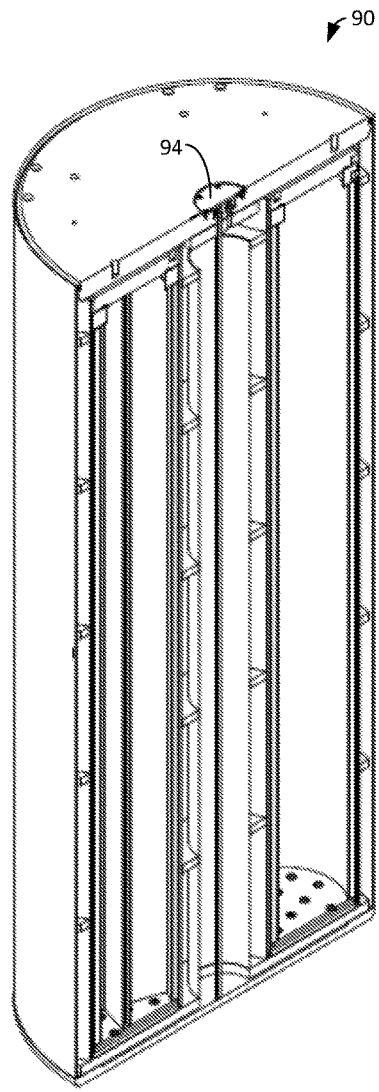
FIG. 21 is a cross-sectional perspective view of the container of FIG. 19 taken along sectional line A-A of FIG. 12.
Figure 20:
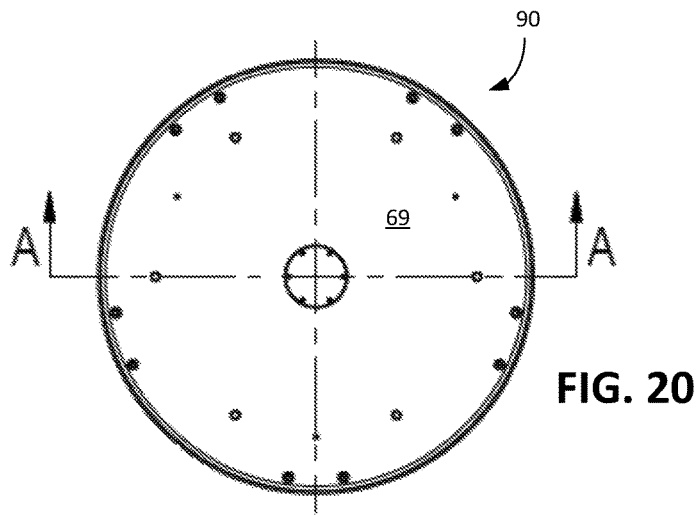
FIG. 20 is a top view of the container of FIG. 19.
Figure 22:
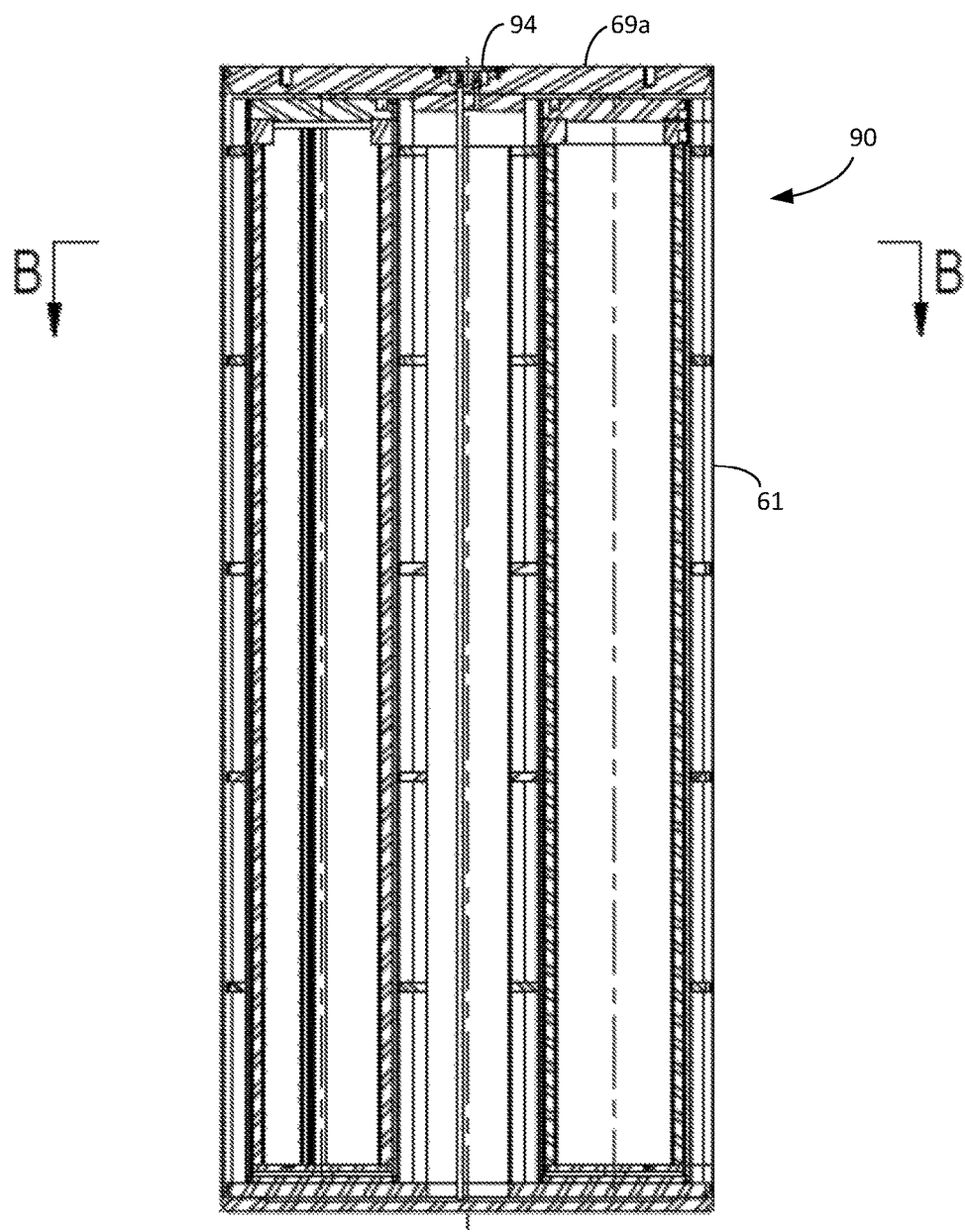
FIG. 22 is a cross-sectional view of the container of FIG. 19 taken along sectional line A-A of FIG. 12.

FIG. 20 is a top view of the container 90 of FIG. 11. FIG. 21 is a cross-sectional perspective view of the container 90 of FIG. 11 taken along sectional line A-A of FIG. 20. FIG. 22 is a cross-sectional view of the container 90 of FIG. 11 taken along sectional line A-A of FIG. 20.

Figure 23:
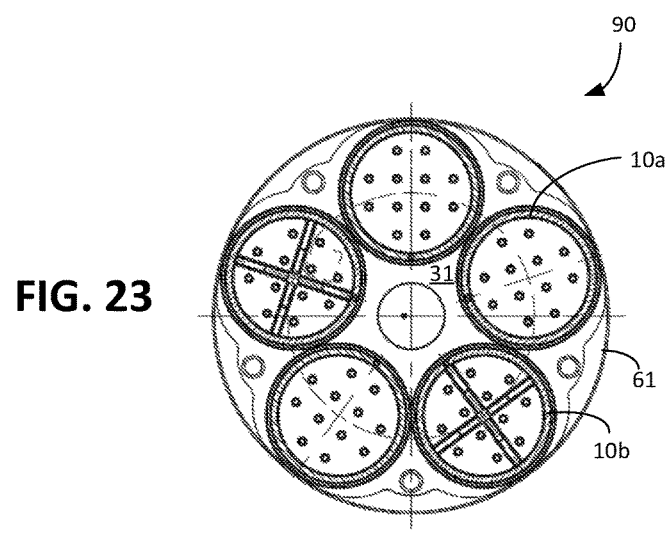
FIG. 23 is a cross-sectional view of the container of FIG. 19 taken along sectional line B-B of FIG. 14.

FIG. 23 is a cross-sectional view of the container 90 of FIG. 11 taken along sectional line B-B of FIG. 22. In this example, the basket 30 is shown with three canisters 10a and two canisters 10b. The container 90 is shown with a cover plate 94, which is used when the container 90 is in a transport configuration.

FIG. 24 is a partial enlarged view showing detail C-C of FIG. 21 involving use of the filter 92 with drain line 96 when the container 90 is in a storage configuration.

Figure 25:
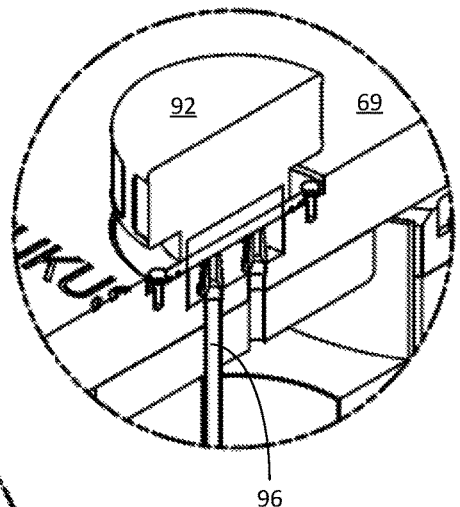
FIG. 25 is a partial enlarged view showing detail C-C of FIG. 21 involving use of a cover plate when the container is in a transport configuration.

FIG. 25 is a partial enlarged view showing detail C-C of FIG. 21 involving use of the cover plate 94 when the container 90 is in a transport configuration.

Figure 26:
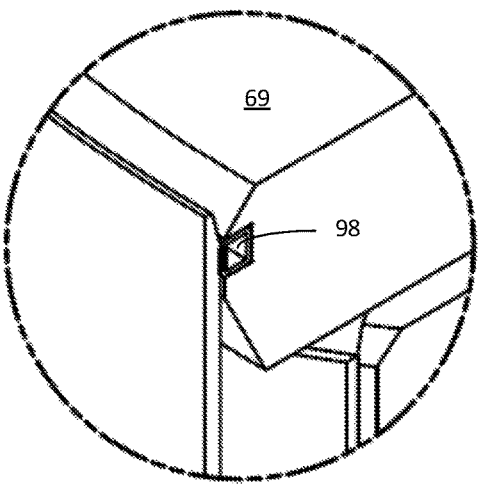
FIG. 26 is a partial enlarged view showing detail D-D of FIG. 21 involving an inflated seal associated with the overpack lid of the container.

FIG. 26 is a partial enlarged view showing detail D-D of FIG. 21 involving an inflatable seal 98 associated with the overpack lid 69 of the container 10.

Although not limited to this design choice, in the preferred embodiments, all parts associated with the canisters 10, the basket 30, and the overpack 61 are made of metal, such as stainless steel, based upon its long term resistance to corrosion and its reasonable cost.

It should be emphasized that the above-described embodiments of the present invention, particularly, any "preferred" embodiments, are merely possible nonlimiting examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

At least the following is claimed:

1. A container for safely storing radioactive debris so that the radioactive debris cannot achieve nuclear criticality, the container residing in water or air, the container comprising:

an overpack having an elongated cylindrical body extending between a top end and a bottom end, a planar bottom part at the bottom end, an open top at the top end, and a circular planar lid mounted over the open top;

a basket situated inside of the overpack;

a plurality of elongated cylindrical canisters that are in parallel along their lengths inside the basket, each of the canisters having an elongated cylindrical body extending between a top end and a bottom end, a planar bottom part at the bottom end, an open top at the top end, and a circular planar lid mounted over the open top, each of the baskets having a internal diameter that is no greater than about 49.5 centimeters (cm) and an interior axial length that is no greater than about 381.0 cm; and radioactive debris in at least one of the canisters, the radioactive debris containing an amount of uranium dioxide (UO2) fuel that is no greater than about 100 kilograms (kg) and that has an initial enrichment of the UO2 fuel being not greater than about 3.7 percent.

2. The container of claim 1, wherein the basket further comprises:

a plurality of spaced corral plates that confine the plurality of elongated cylindrical canisters, each of the corral plates having a plurality of circular apertures, each of the apertures having a respective canister passing through it; and a plurality of elongated lifting bars distributed equally around a periphery of the basket and extending along the plurality of elongated cylindrical canisters, each of the bars having a top end and a bottom end, the bars attached to the plates.

3. The container of claim 2, further comprising a plurality of eye hooks situated at respective top ends of the bars.

4. The container of claim 1, wherein the plurality of elongated cylindrical canisters is five.

5. The container of claim 1, wherein all parts are made from stainless steel.

6. The container of claim 1, further comprising an elongated flux trap inside of at least one of the canisters, the flux trap causing an interior of the canister to be divided into a plurality of sectors, the flux trap designed to slow down neutron movement between the sectors.

7. The container of claim 6, wherein the flux trap has a cross-shaped cross-section with a plurality of spokes along its length, each of the spokes having an internal open region, the open region being lined with a neutron absorber, the open region filled with water when the container is in water and filled with air when the container is removed from water and drained, and wherein the cross-sectional distance that is not less than about 2.54 cm.

8. The container of claim 7, wherein at least one of the four sectors includes at least one nuclear fuel rod assembly, in whole or in part.

9. The container of claim 1, wherein each of the canisters and the overpack comprise respective filtered drains at their respective bottom ends to enable water to drain out of the container.

10. The container of claim 1, wherein each of the canisters and the overpack comprise respective filtered vents at their respective top ends to enable hydrogen to escape the container while preventing radioactive gas from escaping the container.

11. The container of claim 10, further comprising a plate that seals the overpack vent when the container is in a transport configuration.

12. The container of claim 1, wherein each of the canisters comprises a plurality of L-shaped recesses at the top end to enable movement of each.

13. A canister for safely storing nuclear debris so that the radioactive debris cannot achieve nuclear criticality, the canister residing in water or air, the canister comprising:
an elongated cylindrical body extending between a top end and a bottom end, a planar bottom part at the bottom end, an open top at the top end, and a circular planar lid mounted over the open top, the canister having an internal diameter that is no greater than about 49.5 centimeters (cm) and an interior axial length that is no greater than about 381.0 cm; and
radioactive debris situated in the canister, the radioactive debris containing an amount of uranium dioxide (UO2) fuel that is no greater than about 100 kilograms (kg) and that has an initial enrichment of the UO2 fuel no greater than about 3.7 percent.

14. The canister of claim 13, further comprising an elongated flux trap inside of the canister, the flux trap causing an interior of the canister to be divided into a plurality of sectors, the flux trap designed slow down neutron movement between the sectors.

15. The container of claim 14, wherein the flux trap has a cross-shaped cross-section with a plurality of spokes along its length, each of the spokes having an internal open region, the open region being lined with a neutron absorber, the open region filled with water when the container is in water and filled with air when the container is removed from water and drained, and wherein the cross-sectional distance that is not less than about 2.54 cm.

16. A basket, comprising:
a plurality of canisters according to claim 13 that are in parallel along their lengths inside the basket;
a plurality of spaced corral plates that confine the plurality of elongated cylindrical canisters, each of the corral plates having a plurality of circular apertures, each of the apertures having a respective canister passing through it; and
a plurality of elongated bars distributed equally around a periphery of the basket and extending along the plurality of elongated cylindrical canisters, each of the bars having a top end and a bottom end, the bars attached to the plates.

17. The basket of claim 16, further comprising a plurality of eye hooks situated at respective top ends of the bars.

18. A container, comprising:
an overpack having an elongated cylindrical body extending between a top end and a bottom end, a planar bottom part at the bottom end, an open top at the top end, and a circular planar lid mounted over the open top; and
the basket of claim 16 situated inside of the overpack.

19. The canister of claim 13, wherein further comprising a drain at the bottom end to enable water to drain out of the canister and a filtered vent at the top end to enable hydrogen to escape from the canister while preventing radioactive gas from escaping from the canister.

20. A container for safely storing radioactive debris so that the radioactive debris cannot achieve criticality, the container residing in water or air, the container comprising:
an overpack having an elongated cylindrical body extending between a top end and a bottom end, a planar bottom part at the bottom end, an open top at the top end, and a circular planar lid mounted over the open top;
a basket situated inside of the overpack;
a plurality of elongated cylindrical canisters that are in parallel along their lengths inside the basket, each of the canisters having an elongated cylindrical body extending between a top end and a bottom end, a planar bottom part at the bottom end, an open top at the top end, and a circular planar lid mounted over the open top, each of the baskets having a internal diameter that is no greater than about 49.5 centimeters (cm) and an interior axial length that is no greater than about 381.0 cm;
an elongated flux trap inside of at least one canister of the canisters, the flux trap causing an interior of the canister to be divided into a plurality of sectors, the flux trap having open interior regions with air to slow down neutron movement; and
radioactive debris in the at least one canister, the radioactive debris containing an amount of uranium dioxide (UO2) fuel in any amount and at any initial enrichment; and
at least one nuclear fuel rod assembly, in whole or in part, in the at least one canister.

* * * * *